US011713425B2

(12) United States Patent
Suntio et al.

(10) Patent No.: US 11,713,425 B2
(45) Date of Patent: Aug. 1, 2023

(54) METHOD FOR PRODUCING RENEWABLE FUEL (71) Applicant: Neste Oyj, Espoo (FI)

(72) Inventors: Ville Suntio, Espoo (FI); Olli Visuri, Espoo (FI); Petri Lindqvist, Espoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/490,746

(22) Filed: Sep. 30, 2021

(65) Prior Publication Data
US 2022/0098500 A1 Mar. 31, 2022

(30) Foreign Application Priority Data

Sep. 30, 2020 (FI) ..................... 20205953
Sep. 30, 2020 (FI) ..................... 20205954

(51) Int. Cl.
C10G 65/04 (2006.01)
C10G 3/00 (2006.01)
C10G 45/08 (2006.01)
C10G 45/62 (2006.01)

(52) U.S. Cl.
CPC ............. *C10G 65/043* (2013.01); *C10G 3/50* (2013.01); *C10G 45/08* (2013.01); *C10G 45/62* (2013.01); C10G 2300/1018 (2013.01); C10G 2300/202 (2013.01); C10G 2300/304 (2013.01); C10G 2300/4006 (2013.01); C10G 2300/4012 (2013.01); C10G 2300/4018 (2013.01); C10G 2300/4025 (2013.01); C10G 2300/4081 (2013.01); C10G 2300/802 (2013.01); C10G 2400/08 (2013.01)

(58) Field of Classification Search
CPC ........ C10G 3/50; C10G 65/04; C10G 65/043; C10G 2300/202; C10G 2300/304; C10G 2300/4006; C10G 2300/4012; C10G 2300/4018; C10G 2300/4081; C10G 2400/08

See application file for complete search history.

(56) References Cited

U.S. PATENT DOCUMENTS

| 5,705,052 | A | 1/1998 | Gupta | |
|---|---|---|---|---|
| 7,232,935 | B2 * | 6/2007 | Jakkula | C10G 3/50 208/179 |
| 7,872,165 | B2 * | 1/2011 | Bertoncini | C10G 3/46 208/100 |
| 2008/0161614 | A1 | 7/2008 | Bertoncini et al. | |
| 2010/0331586 | A1 * | 12/2010 | Hanks | C10G 3/48 585/240 |
| 2011/0054230 | A1 | 3/2011 | Cole et al. | |
| 2011/0094149 | A1 * | 4/2011 | Weiss | C10G 65/04 44/307 |
| 2011/0163009 | A1 | 7/2011 | Novak et al. | |
| 2012/0184789 | A1 * | 7/2012 | Ackerson | C10G 3/50 585/242 |
| 2013/0116490 | A1 | 5/2013 | Dupassieux et al. | |
| 2013/0261362 | A1 | 10/2013 | Fingland et al. | |
| 2014/0163270 | A1 * | 6/2014 | Chang | C10G 3/50 585/250 |
| 2015/0337222 | A1 | 11/2015 | Dindi et al. | |
| 2017/0029723 | A1 | 2/2017 | Bazer-Bachi et al. | |
| 2021/0207041 | A1 * | 7/2021 | Vermeiren | C10G 67/16 |
| 2021/0395620 | A1 * | 12/2021 | Andersson | C10G 47/18 |

FOREIGN PATENT DOCUMENTS

| EP | 1396531 A2 | 3/2004 | |
|---|---|---|---|
| EP | 3 702 432 A1 | 9/2020 | |
| EP | 3702432 A1 * | 9/2020 | ............... C10G 3/50 |
| WO | 2009126508 A2 | 10/2009 | |
| WO | 2020083989 A1 | 4/2020 | |

OTHER PUBLICATIONS

Dijs et al., "Quantitative Determination by 14C Analysis of the Biological Component in Fuels," Radiocarbon, 2006, vol. 48, No. 3, pp. 315-323.
Manrique et al., "Basic Nitrogen Compounds in Crude Oils: Effect on Mineral Dissolution During Acid Stimulation Processes," Society of Petroleum Engineers, 1997, SPE 37224. (13 pages).
Finnish Communication of Acceptance Under Section 29a of Patents Decree dated Aug. 24, 2021 issued by the Finnish Patent and Registration Office in corresponding Finnish Patent Application No. 20205953. (60 pages).
Finnish Search Report dated Dec. 16, 2020 issued by the Finnish Patent and Registration Office in corresponding Finnish Patent Application No. 20205953. (2 pages).
Finnish Search Report dated Dec. 16, 2020 issued by the Finnish Patent and Registration Office in corresponding Finnish Patent Application No. 20205954. (2 pages).
International Search Report dated Jan. 14, 2022, in International Patent Application No. PCT/EP2021/076884. (3 pages).
Written Opinion of the International Searching Authority dated Jan. 14, 2022, in International Patent Application No. PCT/EP2021/076884. (8 pages).

(Continued)

Primary Examiner — Randy Boyer
(74) Attorney, Agent, or Firm — Buchanan Ingersoll & Rooney PC (57) ABSTRACT A process for preparing hydrocarbons from an oxygenated hydrocarbon feedstock, such as animal fat, having a high nitrogen impurity is described. The process involves hydrotreatment of the oxygenated feedstock in a first hydrotreating reactor and a further hydrotreatment in a second hydrotreating reactor, where between the two reactors, the gaseous phase is removed. The specific process setup effectively removes nitrogen impurities from the resultant hydrocarbon product causing an improved cloud point after isomerisation.

29 Claims, 2 Drawing Sheets (56) References Cited

OTHER PUBLICATIONS

International Search Report dated Jan. 17, 2022, in International Patent Application No. PCT/EP2021/076885. (3 pages).
Written Opinion of the International Searching Authority dated Jan. 17, 2022, in International Patent Application No. PCT/EP2021/076885. (7 pages).
J R. Katzer et al., "Process and Catalyst Needs for Hydrodenitrogenation", Catalyst Reviews, Dec. 6, 2006, pp. 155-208, vol. 20, No. 2.

* cited by examiner

METHOD FOR PRODUCING RENEWABLE FUEL

TECHNICAL FIELD

The present invention relates to processes for preparing hydrocarbons from an oxygenated hydrocarbon feedstock having a nitrogen impurity of 500 wppm or more, measured as elemental nitrogen, and in particular to increasing quality and amount of aviation fuel obtained therefrom.

BACKGROUND ART

Converting fossil oils (such as crude oils) and renewable oils (such as plant oils or animal fats) into valuable products, such as transportation fuels (e.g. gasoline, aviation fuel and diesel) involve hydrotreating processes, which consumes hydrogen.

Refining of heavy crude oil and low quality plant oils and animal fats, such as waste animal fat increases the hydrogen demand in hydrotreating processes. Thus, generating, recovering and purchasing of hydrogen for hydrotreatment of oil have significant impact on refinery operating costs.

Hydrotreating of fossil and renewable oils are performed with an excess of hydrogen compared to the theoretical consumption. The hydrogen remaining after hydrotreating step may be purified and recycled together with additional fresh hydrogen to make up for the hydrogen consumed in the hydrotreating step, the so-called make-up hydrogen.

During hydrotreating a number of reactions occur to various extents depending on the feedstock composition. Hydrotreating reactions include double bond hydrogenation, hydrodeoxygenation (HDO), hydrodesulfurisation (HDS), hydrodenitrification (HDN), hydrodearomatisation (HDAr), hydrocracking (HC) and hydroisomerisation.

Hydroisomerisation is typically done on a bifunctional catalyst having both metal dehydrogenation function and acidic function, for example platinum or palladium catalysts together with molecular sieves such as SAPO-11. Isomerisation selectivity of the catalyst is important, i.e. typically hydrocracking that also occurs to a certain extent during hydroisomerisation is suppressed, if during hydrotreatment it is not desired to reduce the average molecular weight of feed. This involves a balance between metal dehydrogenation function and acidic functions, which is sensitive to elements that can shift this balance. It is speculated that amines neutralise strong acid sites, leading to low catalyst acidity and activity. Sulfur is known to poison the metal dehydrogenation function of noble metal catalysts.

One of the common feed impurities include nitrogen, which are well-known constituents of oil of fossil and of renewable origin. In crude oil average contents of 940 w-ppm and contents as high as 7500 w-ppm has been reported (Manrique et al. (1997) *Basic Nitrogen Compounds in Crude Oils: Effect on Mineral Dissolution During Acid Stimulation Processes*, SPE-37224-MS; https://www.onepetro.org/conference-paper/SPE-3724-MS). It is also not uncommon that animal fat can contain 1000 ppm nitrogen or even higher. The typical way of handling undesirable impurities in feedstocks, such as nitrogen impurities, is to purify the feedstock prior to hydrotreatment. It is simple to remove the water-soluble nitrogen compounds through degumming. However, in animal fat, a major part of the nitrogen compounds are oil soluble, and much more difficult to remove than the water-soluble nitrogen compounds.

US 2011/0094149 A1 (to IFP Energies Nouvelles) describes methods of hydrotreating feeds from renewable sources in two catalytic zones using a molybdenum catalyst, where the gaseous and liquid effluent from the beds having a higher temperature than the inlet, due to the exothermic nature of the hydrotreatment reaction, is used directly as recycle to heat fresh feed to the catalytic zones. US 2011/0094149 A1 exemplifies the invention using good quality palm oil and soy oil having a small nitrogen impurity of 15 and 23 ppm, respectively, and mentions that feeds from renewable sources generally contain various impurities, such as a nitrogen impurity of generally 1-100 ppm, and even up to 1 wt %. US 2011/0094149 A1 reduces the nitrogen amount in the examples to about 2% of the original amount and does not hydrotreat any impure feed having a nitrogen content outside the general range of 1-100 ppm.

Comparative example 1 hydrotreats and isomerises animal fat having a nitrogen content of about 1 wt % at conditions described in US 2011/0094149 A1, showing that it is possible to hydrotreat impure feeds having a nitrogen content outside the general range of 1-100 ppm. However, the nitrogen content after the hydrodeoxygenation stages is about 2-5 ppm, and after isomerisation, the yield of aviation fuel cut was only 5% having a high pour point of −10° C. compared to the requirements for aviation fuels.

Consequently, there is a need for further hydrotreatment processes that can effectively hydrotreat oxygenated hydrocarbons having a nitrogen impurity outside the general range of 1-100 ppm and ensure a low nitrogen amount in the hydrotreated product. Additionally, there is a need for processes that can produce a high quality aviation fuel cut having good cold flow properties from oxygenated hydrocarbons having a nitrogen impurity outside the general range of 1-100 ppm.

There is a possibility of purifying the feed further before hydrogenation to remove as much nitrogen as possible. However, while purification methods to remove water soluble nitrogen is easily implemented, a lot of the nitrogen content in animal fat is oil soluble, and much more difficult to remove.

SUMMARY OF THE INVENTION

The present invention was made in view of the prior art described above, and the object of the present invention is to provide a process that can improve the quality of a hydrotreated product obtained from an oxygenated hydrocarbon feed containing nitrogen impurities above the general range of 1-100 ppm, in particular where the improved quality at least includes a low amount of nitrogen impurity in the product.

To solve the problem, the present invention provides a process for preparing hydrocarbons from an oxygenated hydrocarbon feedstock (e.g. animal fat), having a nitrogen impurity 150 wppm or more, such as of 300 ppm or 500 wppm or more, measured as elemental nitrogen, where the process comprises two hydrotreatment reactors (101, 102), where the effluent from the first hydrotreating reactor is purified, and where the purified effluent from the first hydrotreating reactor (108) is hydrotreated at a higher temperature in the second hydrotreating reactor (102) and where the feed to the second hydrotreating reactor is not mixed with an oxygenated feedstock.

Figure 1:
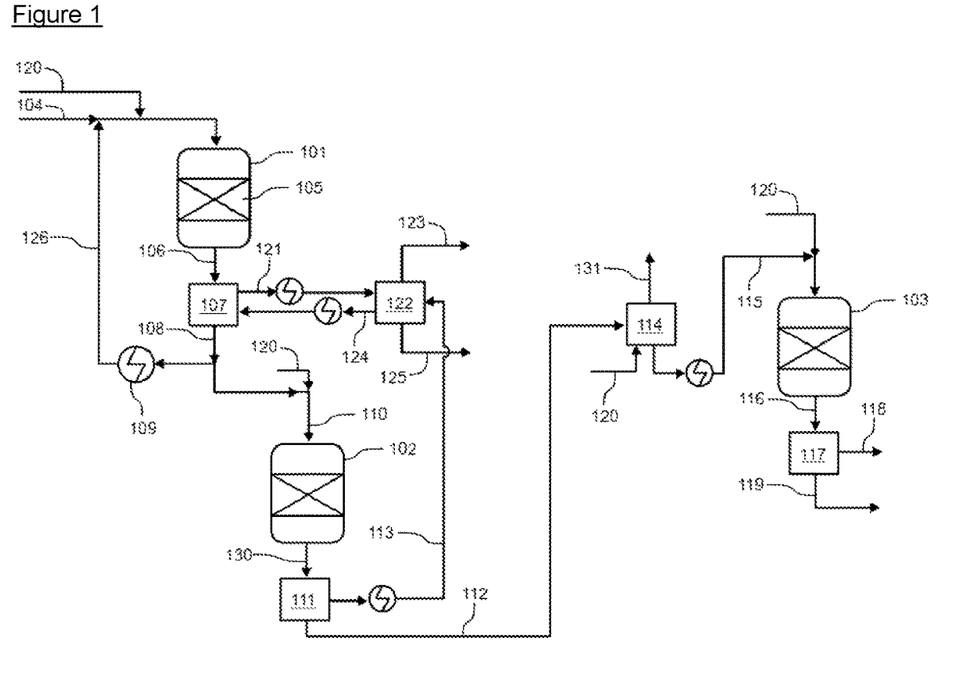
FIG. 1 shows a process scheme according to the present invention having a first hydrotreating reactor (101), a second hydrotreating reactor (102) and a first isomerisation reactor (103).

Specifically, the invention relates to a process for preparing hydrocarbons from an oxygenated hydrocarbon feedstock, having a nitrogen impurity of 300 wppm to 3000 wppm or more, measured as elemental nitrogen, comprising: a first hydrotreatment reactor (101) comprising at least one catalytic zone (105), in which a hydrotreatment entry stream comprising the oxygenated hydrocarbon feedstock (104), and optionally a hydrocarbon diluting agent (126) is introduced into the catalytic zone together with a hydrogen-rich gas (120), at an inlet temperature and a pressure causing at least hydrodeoxygenation and hydrodenitrification to an extent where a first hydrotreated effluent (106) from the first hydrotreatment reactor contains mainly hydrocarbons, and wherein the oxygenated hydrocarbon feedstock has been converted to ≥95% hydrocarbons;

the first hydrotreated effluent (106) from the first hydrotreatment reactor is subjected to a separation stage (107) where at least part of the first hydrotreated effluent (106) is separated into a gaseous fraction (121) and a first hydrotreated liquid (108), where the first hydrotreated liquid contains ≥95 wt % hydrocarbons and >1 wppm nitrogen;

at least part of the first hydrotreated liquid (108) and a hydrogen-rich gas (120) is introduced in a second hydrotreatment reactor (102) comprising at least one catalytic zone at an inlet temperature (that is higher than the inlet temperature in the first hydrotreatment reactor) and at a pressure causing hydrodeoxygenation and hydrodenitrification, where the first hydrotreated liquid is not mixed with a feed having an oxygen content that is higher than the oxygen content of the first hydrotreated liquid, and where the first hydrotreated liquid is not mixed with a feed having a nitrogen content higher than the nitrogen content of the first hydrotreated liquid;

the second hydrotreated effluent (130) from the second hydrotreatment reactor (102) is subjected to one or more separation stages (111 and/or 114), where the second hydrotreated effluent (130) is separated into a gaseous fraction (113) and a second hydrotreated liquid (112) and/or a stripped hydrotreated liquid (115), where the second hydrotreated liquid (112) and/or a stripped hydrotreated liquid (115) contains ≥99 wt % hydrocarbons and ≤1 wppm nitrogen, preferably ≤0.4 wppm nitrogen, such as ≤0.3 wppm nitrogen (the ASTM D4629 detection), measured as elemental nitrogen;

That is, the inventors of the present invention in a first aspect of the invention found that oxygenated hydrocarbons having a nitrogen impurity amount much higher than what is normally present can be effectively hydrotreated in just two hydrotreating reactors containing at least one catalytic zone each, when ammonia and other low boiling amines are removed from the effluent from the first hydrotreating reactor by separation into a gaseous and a liquid phase, followed by hydrotreating the liquid phase therefrom in a second hydrotreating reactor, in which this liquid phase is neither combined with other oxygenated hydrocarbon feeds, nor combined with other feeds having a higher nitrogen content than the first hydrotreated liquid. The second hydrotreated effluent is then separated into a gaseous and a second hydrotreated liquid stream, which separation may be a stripping step or be followed by a stripping step, where the second hydrotreated liquid stream may be stripped with a stripping gas, such as hydrogen to lower the nitrogen content of the stripped hydrotreated liquid to 0.3 wppm or lower.

The second hydrotreated liquid (112) may be used as a product of its own or as recycle to the process. The second hydrotreated liquid may also be isomerised in a first isomerisation reactor (103) comprising at least one catalytic zone, in which the second hydrotreated liquid and a hydrogen-rich gas (120) having ≤1 ppm (mol/mol) nitrogen, measured as elemental nitrogen, is introduced into the catalytic zone at an inlet temperature and a pressure causing at least hydroisomerisation to produce a first isomerisation effluent (116); where the first isomerised effluent (116) from the first isomerisation reactor (103) is subjected to a separation stage (117), where the first isomerised effluent (116) is separated into a gaseous fraction (118) and a first isomerised liquid (119), where the first isomerised liquid contains ≥30 wt % branched hydrocarbons, and/or an increase in branched hydrocarbons of ≥30 wt % compared to the second hydrotreated liquid.

For example, the second hydrotreated liquid (116) or the second hydrotreated effluent (130) is subjected to a stripping stage (114), where the second hydrotreated liquid or second hydrotreated effluent is stripped with a stripping gas (120) causing the stripped hydrotreated liquid (115) to have ≤0.4 wppm nitrogen, measured as elemental nitrogen, and a lower nitrogen amount compared to the second hydrotreated liquid (112), such as ≤0.4 wppm nitrogen, measured as elemental nitrogen; may be subjected to a step of isomerising this stripped hydrotreated liquid (115) in a first isomerisation reactor (103) comprising at least one catalytic zone, in which the stripped hydrotreated liquid (115) and a hydrogen-rich gas (120) having ≤1 ppm (mol/mol) nitrogen, measured as elemental nitrogen, is introduced into the catalytic zone at a temperature and a pressure causing at least hydroisomerisation to produce a first isomerisation effluent (116); where the first isomerised effluent (116) from the first isomerisation reactor (103) is subjected to a separation stage (117), where the first isomerised effluent (116) is separated into a gaseous fraction (118) and a first isomerised liquid (119), where the first isomerised liquid contains ≥30 wt % branched hydrocarbons.

The first isomerised liquid (119) may separated into at least an aviation fuel having a cloud point of −40° C. or lower, such as −47° C. or lower.

Cooling may be applied during the separation stage of the first hydrotreated effluent (106) to an extent that the first hydrotreated liquid (108) has a temperature below the inlet temperature of the first catalytic zone of the first hydrotreatment reactor. For example, where the first hydrotreated liquid (108) has a temperature at least 50° C. below the inlet temperature of the first catalytic zone of the first hydrotreatment reactor.

A diluting agent is not necessary to control the exothermic character of the hydrotreatment reactions in the second hydrotreatment reactor. Accordingly, a hydrocarbon diluting agent may therefore be absent in the second hydrotreatment reactor, i.e. a hydrocarbon diluting agent is in some cases not introduced to the second hydrotreatment reactor (102).

The extent of hydrodeoxygenation and hydrodenitrification in the first hydrotreatment reactor may be controlled in such a manner that in the second hydrotreatment reactor the temperature increase between the reactor inlet and the reactor outlet is not more than 10° C.

The catalytic zone or catalytic zones in the first hydrotreatment reactor (101) may have a lower hydrodeoxygenation activity than the catalytic zone or catalytic zones in the second hydrotreatment reactor (102), or the catalytic zone or catalytic zones in the second hydrotreatment reactor (102) may have a higher hydrodeoxygenation activity than the catalytic zone or catalytic zones in the first hydrotreatment reactor (101).

The hydrogen-rich gas (120) used in the second hydrotreatment reactor (102) may contain ≤5 wppm nitrogen impurities, measured as elemental nitrogen.

The inlet temperature and pressure of the first hydrotreatment reactor (101) may be 200-400° C. and 10-150 bar, for example 250-380° C. and 20-120 bar, such as 280-360° C. and 30-100 bar.

The first hydrotreatment reactor (101) may comprise at least three catalytic zones or up to three catalytic zones, for example one, two or three catalytic zones.

The catalytic zones of the first hydrotreatment reactor may comprise one or more catalyst(s) selected from hydrogenation metal on a support, such as for example a catalyst selected from a group consisting of Pd, Pt, Ni, Co, Mo, Ru, Rh, W or any combination of these. For example, the catalytic zones may comprise one or more catalyst(s) selected from CoMo, NiMo, NiW, CoNiMo on a support, for example an alumina support.

The first hydrotreatment reactor (101) may be operated at a WHSV in the range from 0.5-3 $h^{-1}$; and a $H_2$ flow of 350-900 Nl $H_2$/l feed.

The inlet temperature and pressure of the second hydrotreatment reactor (102) may be 250-450° C. and 10-150 bar, for example 300-430° C. and 20-120 bar, such as 330-410° C. and 30-100 bar.

The second hydrotreatment reactor (102) may have a single catalytic zone.

The catalytic zones of the second hydrotreatment reactor may comprise one or more catalyst(s) selected from hydrogenation metal on a support, such as for example a catalyst selected from a group consisting of Pd, Pt, Ni, Co, Mo, Ru, Rh, W or any combination of these. For example, the catalytic zones may comprise one or more catalyst(s) selected from CoMo, NiMo, NiW, CoNiMo on a support, for example an alumina support.

The second hydrotreatment reactor (102) may be operated at a WHSV in the range from 0.5-3 $h^{-1}$; and a $H_2$ flow of 350-900 Nl $H_2$/l feed.

The inlet temperature and pressure of the first isomerisation reactor (103) may be 280-370° C. and 20-50 bar.

The catalytic zones of the first isomerisation reactor may comprise one or more catalyst(s) comprising a Group VIII metal on a support, where the support may be selected from silica, alumina, clays, titanium oxide, boron oxide, zirconia, which can be used alone or as a mixture. For example, the support may be silica and/or alumina.

Additionally, the one or more catalyst(s) may further comprise a molecular sieve, such as a zeolite.

The isomerisation reactor (103) may be operated at a WHSV in the range from 0.5-1 $h^{-1}$; and a $H_2$ flow of 300-500 Nl $H_2$/l feed.

The first isomerised liquid may be isomerised to such an extent that the iso- to n-paraffin ratio is above 1, such as from 1 to 2.5.

The hydrotreatment entry stream may have a nitrogen impurity of 100 to 500 wppm or more.

The first hydrotreated effluent (106) from the first hydrotreatment reactor may have a nitrogen impurity of 100 to 500 wppm or more.

DETAILED DESCRIPTION OF THE INVENTION

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose. When reference is made to amounts of nitrogen content, it is intended to be the nitrogen content, measured as elemental nitrogen, unless otherwise has been stated.

The present invention relates to a process for preparing hydrocarbons from an oxygenated hydrocarbon feedstock, having a nitrogen impurity of 500 wppm or more, measured as elemental nitrogen, comprising:

a first hydrotreatment reactor (101) comprising at least one catalytic zone (105), in which a hydrotreatment entry stream comprising the oxygenated hydrocarbon feedstock (104) and optionally a hydrocarbon diluting agent (126) is introduced into the catalytic zone together with a hydrogen-rich gas (120), at an inlet temperature and a pressure causing at least hydrodeoxygenation and hydrodenitrification to an extent where a first hydrotreated effluent (106) from the first hydrotreatment reactor contains mainly hydrocarbons, wherein the hydrotreatment entry stream has a nitrogen impurity of 100 wppm or more, and wherein the oxygenated hydrocarbon feedstock has been converted to ≥95% hydrocarbons;

the first hydrotreated effluent (106) from the first hydrotreatment reactor is subjected to a separation stage (107) where at least part of the first hydrotreated effluent (106) is separated into a gaseous fraction (121) and a first hydrotreated liquid (108), where the first hydrotreated liquid contains ≥95 wt % hydrocarbons and >1 wppm nitrogen;

at least part of the first hydrotreated liquid (108) and a hydrogen-rich gas (120) is introduced in a second hydrotreatment reactor (102) comprising at least one catalytic zone at an inlet temperature (that is higher than the inlet temperature in the first hydrotreatment reactor) and at a pressure causing hydrodeoxygenation and hydrodenitrification, where the first hydrotreated liquid is not mixed with a feed having an oxygen content that is higher than the oxygen content of the first hydrotreated liquid, and where the first hydrotreated liquid is not mixed with a feed having a nitrogen content higher than the nitrogen content of the first hydrotreated liquid;

the second hydrotreated effluent (130) from the second hydrotreatment reactor (102) is subjected to one or more separation stages (111 and/or 114), where the second hydrotreated effluent (130) is separated into a gaseous fraction (113) and a second hydrotreated liquid (112) and/or a stripped hydrotreated liquid (115), where the second hydrotreated liquid (112) and/or a stripped hydrotreated liquid (115) contains ≥99 wt % hydrocarbons and ≤1 wppm nitrogen, preferably ≤0.4 wppm nitrogen, such as ≤0.3 wppm nitrogen (the ASTM D4629 detection), measured as elemental nitrogen;

That is, the inventors of the present invention in a first aspect of the invention found that oxygenated hydrocarbons having a nitrogen impurity amount much higher than what is normally present can be effectively hydrotreated in just two hydrotreating reactors containing at least one catalytic zone each, when ammonia and other low boiling amines are removed from the effluent from the first hydrotreating reactor by separation into a gaseous and a liquid phase, followed by hydrotreating the liquid phase therefrom in a second hydrotreating reactor, in which this liquid phase is neither combined with other oxygenated hydrocarbon feeds, nor combined with other feeds having a higher nitrogen content than the first hydrotreated liquid. The second hydrotreated effluent is then separated into a gaseous and a second hydrotreated liquid stream, which separation may be a stripping step or be followed by a stripping step, where the second hydrotreated liquid stream may be stripped with a stripping gas, such as hydrogen to lower the nitrogen content of the stripped hydrotreated liquid to 0.3 wppm or lower.

The process is for preparing hydrocarbons from an oxygenated hydrocarbon feedstock. Examples of oxygenated hydrocarbon feedstocks are fatty acids and triglycerides, which are present in large amounts in plant oils and animal fats. An oxygenated hydrocarbon feedstock of renewable origin, such as plant oils and animal fats are well suited for the process. The majority of these plant oils and animal fats are typically composed of 25 wt % or 40 wt % or more of fatty acids, either as free fatty acids or as esters of free fatty acids. Examples of esters of free fatty acids are fatty acid glyceride esters (mono-, di- and/or tri-glyceridic) or for example the fatty acid methyl esters (FAME) or fatty acid ethyl esters (FAE). Accordingly, the oxygenated hydrocarbon feedstocks of renewable origin may contain 25 wt % or more of fatty acids or fatty acid esters.

The renewable character of carbon-containing compositions, such as feedstocks and products, can be determined by comparing the $^{14}$C-isotope content of the feedstock to the $^{14}$C-isotope content in the air in 1950. The $^{14}$C-isotope content can be used as evidence of the renewable origin of the feedstock or product.

Carbon atoms of renewable material comprise a higher number of unstable radiocarbon ($^{14}$C) atoms compared to carbon atoms of fossil origin. Therefore, it is possible to distinguish between carbon compounds derived from biological sources, and carbon compounds derived from fossil sources by analysing the ratio of $^{12}$C and $^{14}$C isotopes. Thus, a particular ratio of said isotopes can be used to identify renewable carbon compounds and differentiate those from non-renewable i.e. fossil carbon compounds. The isotope ratio does not change in the course of chemical reactions. Examples of a suitable method for analysing the content of carbon from biological sources is ASTM D6866 (2020). An example of how to apply ASTM D6866 to determine the renewable content in fuels is provided given in the article of Dijs et al., Radiocarbon, 48(3), 2006, pp 315-323. For the purpose of the present invention, a carbon-containing material, such as a feedstock or product is considered to be of renewable origin if it contains 90% or more modern carbon, such as 100% modern carbon, as measured using ASTM D6866.

A number of plant oils and animal fats may contain typical amounts of nitrogen impurity, such as between 1-100 ppm, which would also be able to be hydrotreated using the process of the present invention. However, the process of the present invention is advantageous from the point of view that the hydrotreatment process can convert oxygenated hydrocarbon feedstocks having a high nitrogen impurity, for example having a nitrogen impurity of 300 wppm to 2500 wppm, or more, such as 500 wppm or more, for example 800 wppm or more. Oxygenated hydrocarbon feedstocks may for example have a nitrogen impurity of up to 1500 wppm, such as 2500 wppm. Examples of oxygenated hydrocarbon feedstocks with high nitrogen impurity are some animal fats, which can have nitrogen impurities of about 1000 wppm, for example in the range of 600 to 1400 wppm. The oxygenated hydrocarbon feedstock may be made up of a mixture of oxygenated hydrocarbons from different sources, should that be desired. For example, 50% of a palm oil having 23 ppm nitrogen impurity may be mixed with 50% animal fat having 1000 ppm nitrogen impurity to create an oxygenated hydrocarbon feedstock having a nitrogen impurity of 512 ppm. The oxygenated hydrocarbon feedstock may therefore be selected from plant oils, animal fats, or mixtures thereof.

The nitrogen impurity is measured as elemental nitrogen. One such method to measure elemental nitrogen is ASTM D4629, which is used in the range of 0.3-100 wppm, and another method is ASTM D572, which may be more appropriate above 100 wppm. Both methods can be used as necessary in the present invention to measure the nitrogen impurity is as elemental nitrogen.

The process involves flowing a hydrotreatment entry stream to a first hydrotreatment reactor (101) comprising at least one catalytic zone (105). The hydrotreatment entry stream comprise the oxygenated hydrocarbon feedstock (104), which can be selected as described above, e.g. plant oils, animal fat or mixtures thereof containing 300 wppm nitrogen or more, such as 500-1500 wppm nitrogen. The hydrotreatment entry stream may optionally contain a hydrocarbon diluting agent (126). The hydrocarbon diluting agent may be product recycle (126) or a hydrocarbon of either fossil or renewable origin. It will usually be product recycle, which is added to the oxygenated hydrocarbon feedstock, in order to control the exothermic character of the hydrotreatment reactions. If a hydrocarbon diluting agent is added, it will typically be added in amounts ranging from 1:1 to 4:1 (total hydrocarbon diluting agent:total oxygenated feedstock). As mentioned, the hydrocarbon diluting agent may be of fossil or renewable origin. Some hydrocarbon feeds of fossil origin can contain a high amount of nitrogen impurities. These hydrocarbon feeds of fossil origin may also be part of the hydrocarbon diluting agent, alone or in admixture with other hydrocarbon diluting agent(s), such as product recycle. For example the hydrocarbon diluting agent may be a mixture of product recycle and fossil hydrocarbons.

The product recycle is advantageous to use as it will typically contain dissolved hydrogen, which is relevant for the hydrotreatment reaction that depends on hydrogen being dissolved in the liquid phase.

The hydrotreatment entry stream has a nitrogen impurity of 100 wppm or more, e.g. from 100 to 500 wppm, and/or the first hydrotreated effluent (106) from the first hydrotreatment reactor may have a nitrogen impurity of 100 to 500 wppm or more. Hydrotreatment entry streams having nitrogen impurities below 100 wppm would also be able to be hydrotreated using the process of the present invention. However, the process of the present invention is advantageous from the point of view that the hydrotreatment process can convert oxygenated hydrocarbon feedstocks having a high nitrogen impurity without the need for extensive dilution to reduce the overall nitrogen impurity of the hydrotreatment entry stream. This is advantageous, as an extensive dilution would decrease the throughput of oxygenated hydrocarbon feedstock the hydrotreating process. Alternatively, or additionally, the nitrogen content may also be measured in the first hydrotreated effluent (106) from the first hydrotreatment reactor, which may have a nitrogen impurity of 100 to 500 wppm or more.

As to the maximum amount of nitrogen impurity that may be present. There will be limitations as to how much nitrogen impurity that is present as impurities or how high an impurity it is practically feasible to remove. Accordingly, the hydrotreatment entry stream and/or the first hydrotreated effluent (106) from the first hydrotreatment reactor may have a nitrogen impurity of up to 500 wppm or less, i.e. the hydrotreatment entry stream and/or the first hydrotreated effluent (106) from the first hydrotreatment reactor may have a nitrogen impurity of up between 100 and 500 wppm.

The hydrotreatment entry stream is introduced together with a hydrogen-rich gas (120) to a first hydrotreatment reactor (101) comprising at least one catalytic zone (105).

The hydrogen-rich gas (120) is necessary to perform i.a. the hydrodeoxygenation (HDO) and hydrodenitrification (HDN) reactions in the first hydrotreatment reactor (101). The hydrogen-rich gas may for example be excess hydrogen from the process (123, 131, 118) that has been purified by one or more purification steps (122), such as for example separation (122) into a gaseous fraction (123) comprising water, ammonia and other lights followed by amine scrubbing and/or membrane separation. The purity of the hydrogen-rich gas used in the first hydrotreatment reactor is not as important as the purity of the hydrogen-rich gas used for the second hydrotreatment reactor (102), used for stripping before the isomerisation reactor (114) or used in the isomerisation reactor (103), which suitably does not contain any reactive nitrogen, such as ammonia, such as less than 0.3 w-ppm nitrogen, measured as elemental nitrogen. Typically, it is acceptable that the hydrogen-rich gas used for the first hydrotreating reactor has a purity of 95 mol % or higher, but it is also possible that it has a hydrogen purity that is lower than 95 mol %. Make-up hydrogen can also be mixed to form the hydrogen-rich gas, or the hydrogen-rich gas can be entirely made up of make-up gas.

The hydrotreatment reactor (101) is a vessel that can house the at least one catalytic zone. In the present invention a trickle-bed reactor is well-suited. A trickle bed reactor involves the downward movement of the hydrotreatment entry stream while it is contacted with hydrogen in a co-current or counter-current manner. An example of a trickle bed reactor is an adiabatic trickle-bed reactor.

The first hydrotreatment reactor (101) comprises at least one catalytic zone (105). Such a catalytic zone may in its simplest form be a fixed bed of catalyst particles. It may also be multiple fixed beds having the same or different catalyst particles, or it may be a number of layers of catalyst particles of different activity and/or composition.

The first hydrotreatment reactor (101) may comprise at least three catalytic zones or up to three catalytic zones, for example one, two or three catalytic zones.

The hydrotreatment entry stream is introduced together with a hydrogen-rich gas (120) to a first hydrotreatment reactor (101) comprising at least one catalytic zone (105).

The hydrotreatment entry stream is introduced together with a hydrogen-rich gas (120) into the catalytic zone at an inlet temperature and a pressure causing at least hydrodeoxygenation and hydrodenitrification to an extent where the first hydrotreated effluent (106) from the first hydrotreatment reactor contains mainly hydrocarbons;

There are many different combinations of inlet temperatures and pressures, which would cause HDO and HDN to an extent that oxygen is removed from the oxygenated hydrocarbons thereby producing water as a by-product, and that the nitrogen impurities are removed from the oxygenated hydrocarbons thereby producing ammonia as a by-product, and a product containing mainly hydrocarbons. For example the inlet temperature and pressure of the first hydrotreatment reactor (101) may be 200-400° C. and 10-150 bar, for example 250-380° C. and 20-120 bar, such as 280-360° C. and 30-100 bar.

It is a matter of routine work for the skilled person to select various combinations of temperatures and pressures causing at least hydrodeoxygenation and hydrodenitrification to an extent where the first hydrotreated effluent (106) from the first hydrotreatment reactor contains mainly hydrocarbons, wherein the oxygenated hydrocarbon feedstock has been converted to ≥95% hydrocarbons, suitably ≥98% hydrocarbons, where ≤2% of the oxygenated hydrocarbon feedstock is present.

In the same manner that the skilled person can select various combinations of temperatures and pressures, he would also be able to select one or more suitable catalysts for one or more the catalytic zones of the first hydrotreatment reactor.

For example, the catalytic zones of the first hydrotreatment reactor may comprise one or more catalyst(s) selected from hydrogenation metal on a support, such as for example a catalyst selected from a group consisting of Pd, Pt, Ni, Co, Mo, Ru, Rh, W or any combination of these. For example, the catalytic zones may comprise one or more catalyst(s) selected from CoMo, NiMo, NiW, CoNiMo on a support, for example an alumina support. When the catalyst is selected from the group consisting of Ni, Co, Mo, Ru, Rh, W or any combination of these, then typically the catalyst is sulfided, and a source of sulfur is either added or present in the hydrotreatment entry stream and/or in the hydrogen-rich gas.

The first hydrotreatment reactor (101) may be operated at a WHSV in the range from 0.5-3 h$^{-1}$, such as 0.5-1.5 h$^{-1}$ and a H$_2$ flow of 350-2100 Nl H$_2$/l feed, such as 500-1500 Nl H$_2$/l feed.

More general reaction conditions for the first hydrotreatment step may involve a trickle-bed reactor as the first hydrotreating reactor, comprising a catalyst zone, the catalyst zone comprising a supported hydrogenation catalyst comprising molybdenum, where the hydrotreatment is conducted in the presence of hydrogen at a temperature of 200-400° C. and at a pressure between 10-150 bar, where the WHSV is in the range from 0.5-3 h$^{-1}$, and at a H$_2$ flow of 300-2100 Nl H$_2$/l feed.

The first hydrotreatment step will generate a first hydrotreated effluent (106), which will contain gaseous components in the form of excess hydrogen, water vapour produced from HDO, CO and CO$_2$ produced from decarboxylation/decarbonylation of carboxylic acids in the oxygenated hydrocarbon feed as well as H$_2$S. Finally, NH$_3$ will be produced from the HDN reaction. Much more ammonia (NH$_3$) will be produced in the process of the present invention, than during hydrotreatment of normal feeds e.g. having the typical amounts of 1-100 ppm nitrogen, such as palm oil, which, for example, may have 23 ppm nitrogen. The inventors surprisingly found that the increased amount of ammonia in the hydrotreatment effluent caused reincorporation of nitrogen, when the hydrotreated effluent was subjected to a second hydrotreatment step with added make-up hydrogen. That is, the inventors saw that the second hydrotreatment effluent from such a second hydrotreatment step contained 2-5 ppm nitrogen even after stripping with hydrogen gas, i.e. even if there was a desire to remove nitrogen as completely as possible before contacting with an isomerisation catalyst, it was simply not possible to get the nitrogen amount below 2-5 ppm, even after stripping. This was quite unexpected, as the second hydrotreatment step was conducted at higher temperatures with the specific expectation of preforming a deeper HDO and HDN hydrotreatment, thereby removing more extensively oxygen and nitrogen from the first hydrotreatment effluent. Further, it was expected that the already formed hydrocarbons should be inert to any reaction with ammonia, and even if ammonia should react to generate amines or amides under the conditions of the second hydrotreatment step, that even if there was a theoretical possibility that such nitrogen compounds would form, that these formed compounds would again undergo hydrodenitrification (HDN) removing therefrom ammonia. However, it was surprisingly found that nitrogen compounds were generated that did not disappear again under the hydrotreatment conditions in the second hydrotreatment reactor. Those compounds included secondary and tertiary amides.

As it is known in the art, nitrogen may deactivate the isomerisation catalyst, which is why ammonia contained in an effluent going to an isomerisation reactor is typically stripped with a stripping gas, causing any dissolved ammonia to be displaced/stripped by the stripping gas thereby removing any remaining amounts of nitrogen. As was found by the inventors in comparative example 1, the absence of a separation step between the first and second hydrotreating reactor, when hydrotreating oxygenated hydrocarbon feedstocks, will cause a higher nitrogen content to be present to be fed to the isomerisation reactor, which in turn causes a lower yield of aviation fuel cut having a cloud point of −40° C. or lower.

It was an unexpected discovery that ammonia in the first hydrotreated effluent caused reincorporation of nitrogen in the second hydrotreatment reactor, and that these nitrogen compounds were also unexpectedly resilient to the HDN conditions, which caused the normal removal of any residual ammonia in the stripping step prior to isomerisation to be ineffective. This was surprising to the inventors, who modified the hydrotreatment steps by including a separation stage after the first hydrotreatment reactor, in such a way that the first hydrotreated effluent from the first hydrotreatment reactor is subjected to a separation stage (107) where at least part of the first hydrotreated effluent (106) is separated into a gaseous fraction (121) and a first hydrotreated liquid (108)

The separation stage (107) may be for example one or more high-pressure or low-pressure separators, that are known in the art to be able to separate the first hydrotreated effluent (106) into a gaseous fraction (121) and a first hydrotreated liquid (108). Hydrogen stripping may also be used for the separation (not shown in the figure). The separation stage may entirely be a high temperature separation stage, where the effluent is not actively cooled. Not cooling the first hydrotreatment effluent is beneficial from the point of view that less heating is required in the second hydrotreating step. It may also be beneficial, if the separated first hydrotreated liquid is used as a product recycle to dilute the oxygenated hydrocarbon feedstock.

The separation stage may also involve a low temperature separation, where the hydrotreated effluent is actively cooled by e.g. a heat exchanger, as this is beneficial from the point of view that as much ammonia as possible is separated from the first hydrotreated liquid. Accordingly, cooling may be applied during the separation stage of the first hydrotreated effluent (106) to an extent that the first hydrotreated liquid (108) has a temperature below the inlet temperature of the first catalytic zone of the first hydrotreatment reactor. For example, where the first hydrotreated liquid (108) has a temperature at least 50° C. below the inlet temperature of the first catalytic zone of the first hydrotreatment reactor, such as at least 100° C. below the inlet temperature of the first hydrotreatment reactor. Cold separation of the first hydrotreatment effluent may for example be performed at temperatures between 120 and 200° C.

The entire amount of the first hydrotreated effluent (106) may be separated, or at least part of the first hydrotreated effluent (106) may be separated. For example, the first hydrotreated effluent may be split into two streams, where the first stream is separated into a first hydrotreated liquid and a gaseous fraction as described above, and where the second stream is used as a hydrocarbon diluting agent without any separation. The second stream would in addition to hydrocarbons also include both the excess hydrogen as well as all the gaseous impurities, including ammonia, which would be reintroduced into the first hydrotreating reactor.

The entire amount of the first hydrotreated effluent (106) may be separated, to avoid ammonia build-up in the first hydrotreating reactor or to avoid adding further amounts of ammonia to the first hydrotreating reactor (when the first hydrotreating effluent is used as product recycle), which could react with the oxygenated hydrocarbons to form further nitrogen compounds, which could then be present in the first hydrotreating effluent.

In the separation stage (107), the first hydrotreated effluent (106) is separated into a gaseous fraction (121) and a first hydrotreated liquid (108). The gaseous fraction (121) will comprise excess hydrogen, water vapour produced from HDO, CO and $CO_2$ produced from decarboxylation/decarbonylation of carboxylic acids in the oxygenated hydrocarbon feed as well as $H_2S$. Finally, $NH_3$ will be produced from the HDN reaction. The first hydrotreated liquid (108) will contain ≥90 wt % hydrocarbons, the remainder being heteroatom-containing hydrocarbons, such as unreacted oxygenated hydrocarbons. It is desirable that the hydrotreatment is as complete as possible, i.e. that the first hydrotreated liquid (108) contains ≥95 wt % hydrocarbons, such as ≥98 wt % hydrocarbons. However, it is not always feasible or possible to completely hydrotreat the hydrotreatment entry stream completely without increasing the severity of the reaction conditions, which could cause coking of the catalyst, and other undesirable side effects. Accordingly, the conversion may be such that the first hydrotreated liquid (108) also contains ≤99 wt % hydrocarbons, i.e. the hydrotreatment entry stream is hydrotreated to an extent that the first hydrotreated liquid (108) contains between 95 and 99 wt % hydrocarbons.

The remaining components of the first hydrotreated liquid would be heteroatom-containing hydrocarbons, such as oxygenated hydrocarbons or nitrogen containing hydrocarbons. As the initial nitrogen impurity is very high, the nitrogen will still remain to some extent in the first hydrotreated liquid, which may contain >1 wppm nitrogen, measured as elemental nitrogen, such as >5 wppm, and up to 100 wppm.

The first hydrotreated liquid (108) containing nitrogen impurities of e.g. 5-100 wppm, or at least part of the first hydrotreated liquid (108) is introduced in a second hydrotreatment reactor (102) together with a hydrogen-rich gas (120).

The hydrogen-rich gas (120) is necessary to perform i.a. the hydrodeoxygenation (HDO) and hydrodenitrification (HDN) reactions not only in the first hydrotreatment reactor (101) as explained above, but also in the second hydrotreatment reactor (102). The hydrogen-rich gas may for example be excess hydrogen from the process (123, 131, 118) that has been purified by one or more purification steps (122), such as for example separation (122) into a gaseous fraction (123) comprising water, ammonia and other lights followed by amine scrubbing and/or membrane separation. The purity of the hydrogen-rich gas used in the first hydrotreatment reactor is not as important as the purity of the hydrogen-rich gas used for the second hydrotreatment reactor (102), used for stripping before the isomerisation reactor (114) or used in the isomerisation reactor (103).

The hydrogen-rich gas used for the second hydrotreating reactor typically has a purity of 90 mol %, often 95 mol % or higher, and may contain gaseous hydrocarbons. As it is intended to reduce as much as possible the risk of reincorporating nitrogen into the second hydrotreatment effluent (130), the hydrogen-rich gas used for the second hydrotreating reactor ideally has very little or no reactive nitrogen, such as ammonia. Specifically, the nitrogen content in the hydrogen-rich gas (120) used for the second hydrotreating reactor should ideally not cause an increase in the nitrogen content of the liquid phase of the feed (110) for the second hydrotreating reactor (102) when it is mixed with the first hydrotreated liquid (108) to form the feed (110) for the second hydrotreating reactor (102).

The hydrogen-rich gas (120) used in the second hydrotreatment reactor (102) may therefore contain ≤10 wppm nitrogen impurities or lower, such as ≤5 wppm nitrogen impurities, measured as elemental nitrogen, such as ≤1 wppm nitrogen impurities.

The hydrogen-rich gas may be the excess hydrogen gas that has been purified, the so-called hydrogen recycle, if that has a sufficient quality. The hydrogen-rich gas may also be fresh hydrogen, which has not yet been used in the process, and it may be a mixture of the hydrogen recycle and fresh hydrogen.

As will be appreciated by the skilled person, when reference is made to nitrogen impurities, it is intended to cover nitrogen impurities, which under the hydrotreating or hydroisomerisation conditions can be considered to react to form new bonds, i.e. non-inert or reactive nitrogen. For example nitrogen that is capable of being incorporated into the products and intermediates of the present invention, such as the first or second hydrotreating effluent, or the first isomerisation effluent is considered to be nitrogen impurities according to the present invention. It is not intended that nitrogen gas ($N_2$) should fall within the term nitrogen impurities, as it is used in the present invention. Nitrogen impurities can be determined using elemental analysis and cover organic nitrogen, ammonia, and ammonium.

The second hydrotreatment reactor (102) is a vessel that can house the at least one catalytic zone. In the present invention a trickle-bed reactor is well-suited. A trickle bed reactor involves the downward movement of the hydrotreatment entry stream while it is contacted with hydrogen in a co-current or counter-current manner. An example of a trickle bed reactor is an adiabatic trickle-bed reactor.

The second hydrotreatment reactor (102) comprises at least one catalytic zone. Such a catalytic zone may in its simplest form be a fixed bed of catalyst particles. It may also be multiple fixed beds having the same or different catalyst particles, or it may be a number of layers of catalyst particles of different activity and/or composition.

The second hydrotreatment reactor (102) may have a single catalytic zone.

The first hydrotreated liquid (106) is introduced together with a hydrogen-rich gas (120) to a second hydrotreatment reactor (102) where it comes into contact with at least one catalytic zone, at an inlet temperature and a pressure causing at least hydrodeoxygenation and hydrodenitrification, to an extent where the second hydrotreated liquid contains ≥99 wt % hydrocarbons and ≤1 wppm nitrogen, preferably ≤0.4 wppm nitrogen, such as ≤0.3 wppm nitrogen (the ASTM D4629 detection), measured as elemental nitrogen.

Specifically, the nitrogen content of the second hydrotreated liquid (112) is lower than the nitrogen content of the first hydrotreated liquid (108).

It is not required nor intended that the first hydrotreated liquid should be diluted with any diluting agent, such as hydrocarbons, before or during hydrotreatment in the second hydrotreating reactor. Rather the first hydrotreated liquid is the used as the feed to the second hydrotreating reactor. However, it is possible to mix the first hydrotreated liquid with another hydrocarbon feed, as long as the first hydrotreated liquid is not mixed with a feed having an oxygen content that is higher than the oxygen content of the first hydrotreated liquid, and where the first hydrotreated liquid is not mixed with a feed having a nitrogen content of ≥5 wppm;

A diluting agent is not necessary to control the exothermic character of the hydrotreatment reactions in the second hydrotreatment reactor. Accordingly, a diluting agent, such as a hydrocarbon diluting agent, may therefore be absent in the second hydrotreatment reactor, i.e. a hydrocarbon diluting agent is in some cases not introduced to the second hydrotreatment reactor (102).

There are many different combinations of inlet temperatures and pressures, which would cause HDO and HDN to an extent that oxygen is removed from the remaining oxygenated hydrocarbons thereby producing water as a by-product, and that the nitrogen impurities are further reduced compared to the first hydrotreated liquid thereby producing ammonia as a byproduct, and a second hydrotreated liquid (112) containing a lower amount of nitrogen impurities than the first hydrotreated liquid (108).

For example, the inlet temperature and pressure of the second hydrotreatment reactor (102) may be 250-450° C. and 10-150 bar, for example 300-430° C. and 20-120 bar, such as 330-410° C. and 30-100 bar.

In order to cause a deeper HDO and HDN reaction, the inlet temperature of the first catalytic zone of the second hydrotreating reactor may be increased compared to the inlet temperature of the first catalytic zone of the first hydrotreating reactor. For example, the inlet temperature of the second hydrotreatment reactor may be 10-15° C. higher than the inlet temperature for the first hydrotreatment reactor, or even higher.

As the amount of oxygenated hydrocarbons are significantly less in the first hydrotreatment liquid compared to the hydrotreatment entry stream of the first hydrotreatment reactor, this means that the temperature rise over the catalytic beds are not as high as in the catalytic beds of the first hydrotreatment reactor due to the fact that less exothermic reactions occurs.

For example, the temperature increase between the reactor inlet and the reactor outlet of the second hydrotreatment reactor may be small, such as no more than 35° C., or it can be considered as being 50% or less of the temperature rise in the first hydrotreatment reactor.

Accordingly, the extent of hydrodeoxygenation and hydrodenitrification in the first hydrotreatment reactor may be controlled in such a manner that in the second hydrotreatment reactor, the temperature increase between the reactor inlet and the reactor outlet is not more than 10° C. This can be controlled by ensuring a sufficient conversion of the oxygenated hydrocarbon feed in the first hydrotreatment reactor, leaving only a small amount of hydrocarbons having heteroatoms such as oxygen and nitrogen in the first hydrotreated liquid, which will then result in a smaller temperature rise due to the amount of material remaining that undergoes the exothermic hydrotreatment reactions.

To increase the hydrotreating activity in the second hydrotreating reactor, it is possible to increase the temperature, as mentioned above, in order to obtain deeper HDO and HDN reactions. It is also possible to increase the hydrotreating activity by ensuring that the catalytic zone or catalytic zones in the second hydrotreatment reactor (102) may have a higher hydrodeoxygenation activity than the catalytic zone or catalytic zones in the first hydrotreatment reactor (101).

The catalytic activity may also start out by being the same in both the first and second hydrotreating reactors, e.g. by using a catalyst having the same activity in both reactors. Over time the catalytic zone or catalytic zones in the first hydrotreatment reactor will deactivate faster than the catalytic zone or catalytic zones in the second hydrotreatment reactor because a more impure feed, the hydrotreatment entry stream, is provided to the first hydrotreatment reactor, whereas a more pure feed, the first hydrotreated liquid, is provided to the second hydrotreatment reactor. Accordingly, the catalytic zone or catalytic zones in the first hydrotreatment reactor (101) have a lower hydrodeoxygenation activity than the catalytic zone or catalytic zones in the second hydrotreatment reactor (102). Catalytic activity can be measures compared to the fresh catalyst.

In the same manner that the skilled person can select various combinations of temperatures and pressures to cause deeper HDO and HDN reactions, he would also be able to select one or more suitable catalysts for one or more the catalytic zones of the first hydrotreatment reactor, as well as further conditions.

The catalytic zones of the second hydrotreatment reactor may comprise one or more catalyst(s) selected from hydrogenation metal on a support, such as for example a catalyst selected from a group consisting of Pd, Pt, Ni, Co, Mo, Ru, Rh, W or any combination of these. For example, the catalytic zones may comprise one or more catalyst(s) selected from CoMo, NiMo, NiW, CoNiMo on a support, for example an alumina support. When the catalyst is selected from the group consisting of Ni, Co, Mo, Ru, Rh, W or any combination of these, then typically the catalyst is sulfided, and a source of sulfur is either added or present in the hydrotreatment entry stream and/or in the hydrogen-rich gas.

The second hydrotreatment reactor (102) may be operated at a WHSV in the range from 0.5-3 $h^{-1}$, such as 0.5-1.5 $h^{-1}$ and a $H_2$ flow of 350-2100 Nl $H_2$/l feed, such as 500-1500 Nl $H_2$/l feed.

More general reaction conditions for the second hydrotreatment step may involve a trickle-bed reactor as the second hydrotreating reactor, comprising a catalyst zone, the catalyst zone comprising a supported hydrogenation catalyst comprising molybdenum, where the hydrotreatment is conducted in the presence of hydrogen at a temperature of 250-400° C. and at a pressure between 10-150 bar, where the WHSV is in the range from 0.5-3 $h^{-1}$, and at a $H_2$ flow of 500-2100 Nl $H_2$/l feed.

the second hydrotreated effluent (130) from the second hydrotreatment reactor (102) is subjected to one or more separation stages (111 and/or 114), where the second hydrotreated effluent (130) is separated into a gaseous fraction (113) and a second hydrotreated liquid (112) and/or a stripped hydrotreated liquid (115).

The separation stage (111) may be for example one or more high-pressure or low-pressure separators, that are known in the art to be able to separate the second hydrotreated effluent (130) into a gaseous fraction (113) and a second hydrotreated liquid (112). The separation stage may entirely be a high temperature separation stage, where the effluent is not actively cooled. Not cooling the second hydrotreatment effluent is beneficial from the point of view that less heating is required in any following steps, such as a first isomerisation step. It may also be beneficial, if the separated second hydrotreated liquid is used as a product recycle to dilute the oxygenated hydrocarbon feedstock.

The separation stage (114) is a stripper, which uses a gas, usually hydrogen, to remove impurities in the second hydrotreated effluent (130) or the second hydrotreated liquid (112). Hydrogen is usually used as a stripping gas, because the stripping stage then both serves the purpose of removing impurities as well as ensuring that a certain amount of hydrogen is dissolved in the second hydrotreated liquid (112) and/or a stripped hydrotreated liquid (115), which is beneficial if these liquids are taken to e.g. a hydroisomerisation stage, such as the first isomerisation reactor (103). The nitrogen content of the second hydrotreated liquid (112) as well as the stripped hydrotreated liquid (115), if stripping is used, is lower than the nitrogen content of the first hydrotreated liquid (108).

Accordingly, the second hydrotreated effluent (130) from the second hydrotreatment reactor (102) may be stripped with a stripping gas (e.g. hydrogen) subjected to a stripping stage (114) causing the stripped hydrotreated liquid (115) to have ≤0.4 wppm nitrogen, such as ≤0.3 wppm nitrogen (the ASTM D4629 detection limit), measured as elemental nitrogen.

If necessary, e.g. from the perspective of further purifying the second hydrotreated effluent (130) from the second hydrotreatment reactor (102) may first be subjected to a separation stage (111), where the second hydrotreated effluent (130) is separated into a gaseous fraction (113) and a second hydrotreated liquid (112), followed by stripping the second hydrotreated liquid (112) with a stripping gas (e.g. hydrogen) in a stripping stage (114) causing the stripped hydrotreated liquid (115) to have ≤0.4 wppm nitrogen, such as ≤0.3 wppm nitrogen (the ASTM D4629 detection limit), measured as elemental nitrogen.

A stripping stage using hydrogen is beneficial to use in order to both remove impurities as well as ensuring that a certain amount of hydrogen is dissolved in the liquid phase, as explained above. A stripping stage is in particular useful, when liquids are taken to e.g. a hydroisomerisation stage, such as the first isomerisation reactor (103).

However, it is also possible to use a separation stage (111) comprising one or more high-pressure or low-pressure separators, as explained above. This may be relevant, when second hydrotreated liquid is used as a product of its own or as recycle to the process.

The second hydrotreated liquid may be used as a product of its own or as recycle to the process.

The second hydrotreated liquid may also be isomerised in a first isomerisation reactor (103) comprising at least one catalytic zone, in which the second hydrotreated liquid and a hydrogen-rich gas ($H_2$) having ≤1 ppm (mol/mol) nitrogen, measured as elemental nitrogen, is introduced into the catalytic zone at an inlet temperature and a pressure causing at least hydroisomerisation to produce a first isomerisation effluent (116).

A hydrogen-rich gas (120) is also necessary to perform the hydrodeoxygenation (HDO) and hydrodenitrification (HDN) of the first and second hydrotreatment reactors (101, 102) as explained above, but also in the first isomerisation reactor (103).

The hydrogen-rich gas may for example be excess hydrogen from the process (123, 131, 118) that has been purified by one or more purification steps (122), such as for example separation (122) into a liquid fraction (123) comprising water, ammonia and other lights followed by amine scrubbing and/or membrane separation. The purity of the hydrogen-rich gas used in the first isomerisation reactor is important.

The hydrogen-rich gas used for the first isomerisation reactor has a purity of 95% or higher. As it is intended to reduce as much as possible the risk of poisoning the catalytic zone(s) of the first isomerisation reactor. Accordingly, the hydrogen-rich gas used for the second hydrotreating reactor ideally has very little or no reactive nitrogen, such as ammonia.

The hydrogen-rich gas (120) used in the first isomerisation reactor (103) may therefore contain ≤1 ppm (mol/mol) nitrogen impurities, measured as elemental nitrogen. The hydrogen-rich gas may be the excess hydrogen gas that has been purified, the so-called hydrogen recycle, if that has a sufficient quality. The hydrogen-rich gas may also be fresh hydrogen, which has not yet been used in the process, and it may be a mixture of the hydrogen recycle and fresh hydrogen.

As will be appreciated by the skilled person, when reference is made to nitrogen impurities, it is intended to cover nitrogen impurities, which under the hydrotreating or hydroisomerisation conditions can be considered to react to form new bonds, i.e. non-inert or reactive nitrogen. For example nitrogen that is capable of being incorporated into the products and intermediates of the present invention, such as the first or second hydrotreating effluent, or the first isomerisation effluent is considered to be nitrogen impurities according to the present invention. It is not intended that nitrogen gas ($N_2$) should fall within the term nitrogen impurities, as it is used in the present invention. The sulfur impurity, if any, should also be low, when the isomerisation catalyst comprise a noble metal catalyst, such as a catalyst containing Pd or Pt.

The first isomerisation reactor (103) is a vessel that can house the at least one catalytic zone. In the present invention a trickle-bed reactor is well-suited. A trickle bed reactor involves the downward movement of the feed while it is contacted with hydrogen in a co-current or counter-current manner. An example of a trickle bed reactor is an adiabatic trickle-bed reactor.

The first isomerisation reactor (103) comprises at least one catalytic zone. Such a catalytic zone may in its simplest form be a fixed bed of catalyst particles. It may also be multiple fixed beds having the same or different catalyst particles, or it may be a number of layers of catalyst particles of different activity and/or composition. The first isomerisation reactor (103) may have a single catalytic zone.

The second hydrotreated liquid (112) or the stripped hydrotreated liquid (115) is introduced together with a hydrogen-rich gas (120) to a first isomerisation reactor (103) where it comes into contact with at least one catalytic zone, at an inlet temperature and a pressure causing at least hydroisomerisation to produce a first isomerisation effluent (116), to an extent where the liquid part (119) of the first isomerised effluent (116) contains ≥30 wt % branched hydrocarbons, and/or an increase in branched hydrocarbons of ≥30 wt % compared to the second hydrotreated liquid.

There are many different combinations of inlet temperatures and pressures, which would cause hydroisomerisation to an extent the first isomerised effluent (116) contains ≥30 wt % branched hydrocarbons, and/or an increase in branched hydrocarbons of ≥30 wt % compared to the second hydrotreated liquid.

For example, the inlet temperature and pressure of the first isomerisation reactor (103) may be 250-400° C. and 20-50 bar, such as 280-370° C. and 20-50 bar or 295-370° C. and 20-50 bar.

The catalytic zones of the first isomerisation reactor may comprise one or more catalyst(s) comprising a Group VIII metal on a support, where the support may be selected from silica, alumina, clays, titanium oxide, boron oxide, zirconia, which can be used alone or as a mixture. For example, the support may be silica and/or alumina. The Group VIII metal may for example be Pd or Pt. Additionally, the one or more catalyst(s) may further comprise a molecular sieve, such as a zeolite.

The isomerisation reactor (103) may be operated at a WHSV in the range from 0.5-3 $h^{-1}$; and a $H_2$ flow of 150-800 Nl $H_2$/l feed, for example 0.5-1 $h^{-1}$; and a $H_2$ flow of 300-500 Nl $H_2$/l feed.

The skilled person knows how to manipulate the above conditions in order to obtain an extent of hydroisomerisation where the liquid part (119) of the first isomerisation effluent (116), contains more branched hydrocarbons compared to the second hydrotreated liquid. For example to such an extent that the liquid part (119) of the first isomerisation effluent (116), contains ≥30 wt % branched hydrocarbons, and/or an increase in branched hydrocarbons of ≥30 wt % compared to the second hydrotreated liquid.

The first isomerised liquid may also have been isomerised to such an extent that the iso- to n-paraffin ratio is above 1, such as from 1 to 4.5, or from 1 to 2.5.

The degree of isomerisation is often measured as the difference between cloud point of the feed and the product, here between the second hydrotreated liquid and the liquid part (119) of the first isomerisation effluent, where a magnitude of the decrease in cloud point determines how extensive the hydroisomerisation has been. Accordingly, the first isomerised liquid may be isomerised to such an extent that the decrease in cloud point from the second hydrotreated liquid and to the liquid part (119) of the first isomerisation effluent is 10° C. or more.

Normally it is considered that the lower the cloud point, the better, because this would convey good cold flow properties. However, during hydroisomerisation conditions there is also hydrocracking to some extent. In the art there is usually a point where hydrocracking becomes too extensive that the loss of liquid product outweighs the potential for a lower cloud point. The catalyst and any impurities contained therein, as well as the conditions for hydroisomerisation are among the parameters that can influence the degree of hydroisomerisation and hydrocracking. Reference is made to the comparative example 1 and example 1, where it can be seen that the nitrogen impurity before entering the isomerization reactor is much higher in the comparative example 1 (0.6-2.9 wppm) compared to example 1 (≤0.3 wppm). Such a difference in nitrogen content to the isomerisation reactor influences not only the yield of the specific fuel cut, but also significantly influences the cold flow properties thereof.

For example, the second hydrotreated liquid (112) or the second hydrotreated effluent (130) is subjected to a stripping stage (114), where the second hydrotreated liquid or second hydrotreated effluent is stripped with a stripping gas ($H_2$)

causing the stripped hydrotreated liquid (115) to have ≤0.4 wppm nitrogen, such as ≤0.3 wppm nitrogen (the ASTM D4629 detection), measured as elemental nitrogen, and a lower nitrogen amount compared to the second hydrotreated liquid (112); may be subjected to a step of isomerising this stripped hydrotreated liquid (115) in a first isomerisation reactor (103) comprising at least one catalytic zone, in which the stripped hydrotreated liquid (115) and a hydrogen-rich gas (120) having ≤1 ppm (mol/mol) nitrogen, measured as elemental nitrogen, is introduced into the catalytic zone at a temperature and a pressure causing at least hydroisomerisation to produce a first isomerisation effluent (116); where the first isomerised effluent (116) from the first isomerisation reactor (103) is subjected to a separation stage (117), where the first isomerised effluent (116) is separated into a gaseous fraction (118) and a first isomerised liquid (119), where the first isomerised liquid contains ≥30 wt % branched hydrocarbons.

More general reaction conditions for the first isomerisation step may involve a trickle-bed reactor as the first isomerising reactor, comprising a catalyst zone, the catalyst zone comprising a supported hydrogenation catalyst comprising W or Pt or Pd, and a zeolite where the hydroisomerisation is conducted in the presence of hydrogen at a temperature of 295-370° C. and at a pressure between 20-50 bar, where the WHSV is in the range from 0.5-1.5 h$^{-1}$, and at a H$_2$ flow of 150-800 Nl H$_2$/l feed to such an extent that the decrease in cloud point from the second hydrotreated liquid and to the liquid part (119) of the first isomerisation effluent is reduced by 10° C. or more.

The first isomerised effluent (116) from the first isomerisation reactor (103) is subjected to a separation stage (117), where the first isomerised effluent (116) is separated into a gaseous fraction (118) and a first isomerised liquid (119).

The separation stage (117) may be for example one or more high-pressure or low-pressure separators, that are known in the art to be able to separate the first isomerised effluent (116) into a gaseous fraction (118) and a first isomerised liquid (119). The separation stage (117) may also be distillation, although usually it is beneficial to separate the gaseous fraction from the liquid fraction before distillation.

As mentioned above, the first isomerised liquid contains ≥30 wt % branched hydrocarbons, and/or an increase in branched hydrocarbons of ≥30 wt % compared to the second hydrotreated liquid.

The first isomerised effluent (116) or the first isomerised liquid (119) may be subjected to a distillation stage to produce one or more product fractions. Such fractional distillation is well-known in the art.

In particular, the process of the present invention is beneficial because it was surprisingly found that the specific conditions resulted in a large fraction of high quality aviation fuel, see example 1. The aviation fuel fraction contained the C8-C16 hydrocarbons, in particular the major part of the aviation fuel contained the C9-C12 hydrocarbons. The aviation fuel fraction may also be characterised by the distillation range, for example as having a distillation range between 150–250° C.

The first isomerised liquid (119) may separated into at least an aviation fuel having a cloud point of −25° C. or lower, such as −30° C. or lower, for example −40° C. or lower, such as −47° C. or lower.

FIG. 1 describes feeding oxygenated hydrocarbon feedstock (104) mixed with hydrogen-rich gas (120) and hydrocarbon diluting agent (126) in the form of product recycle to a first hydrotreatment reactor (101) comprising at least one catalytic zone (105). The first hydrotreated effluent (106) is separated into a gaseous fraction (121) and a first hydrotreated liquid (108) in separator (107). Gaseous fraction (121) may be flashed again at a lower temperature into gaseous fraction (123), water rich fraction (125), and hydrocarbon rich fraction (124) in separator (122). The first hydrotreated liquid (108) is mixed with hydrogen-rich gas (120) to form the feed (110) for the second hydrotreating reactor (102) comprising at least one catalytic zone, where hydrodeoxygenation and hydrodenitrification is caused to obtain a second hydrotreating effluent (130), which is separated into a gaseous fraction (113) and a second hydrotreating liquid (112) in separator (111). The second hydrotreating liquid (112) is stripped with hydrogen-rich gas (120) in stripper (114) to form a stripped hydrotreated liquid (115), which is mixed with hydrogen-rich gas (120) and fed to a first isomerisation reactor (103) comprising at least one catalytic zone, where the stripped hydrotreated liquid (115) is isomerised to obtain a first isomerised effluent (116), which is separated into a gaseous fraction (118) and a first isomerised liquid (119) in separator (117).

Figure 2:
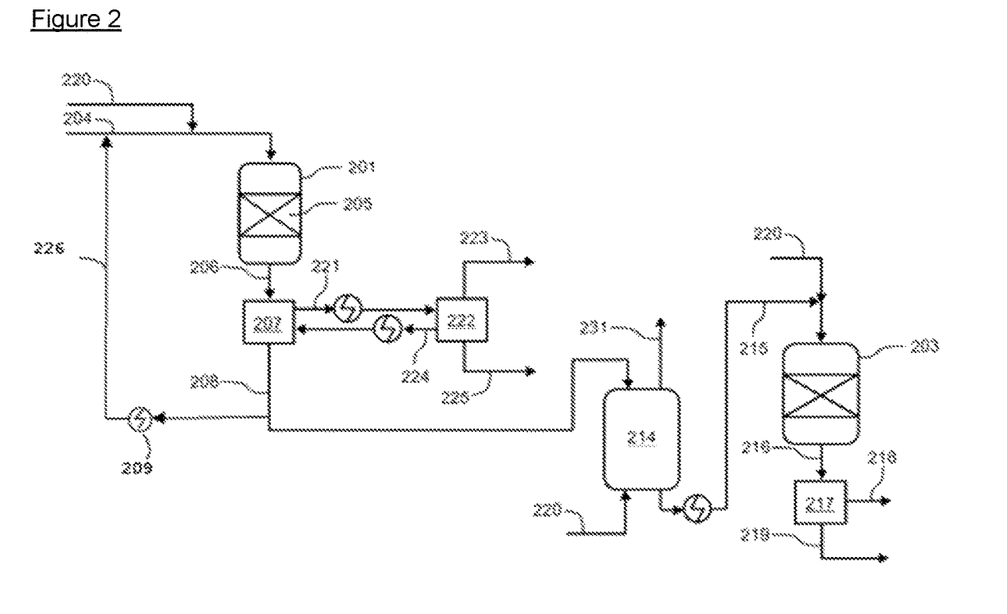
FIG. 2 shows a comparative process scheme not according to the present invention having a first hydrotreating reactor (201) and a first isomerisation reactor (203).

FIG. 2 is a comparative reactor setup referred to in comparative example 1 and in table 7. It is similar to FIG. 1, but omits the second hydrotreating reactor. FIG. 2 describes feeding oxygenated hydrocarbon feedstock (204) mixed with hydrogen-rich gas (220) and hydrocarbon diluting agent (226) to a first hydrotreatment reactor (201) comprising at least one catalytic zone (205). The first hydrotreated effluent (206) is separated into a gaseous fraction (221) and a first hydrotreated liquid (208) in separator (207). Gaseous fraction (221) may be flashed again at a lower temperature into gaseous fraction (223), water rich fraction (225), and hydrocarbon rich fraction (224) in separator (222). The first hydrotreated liquid (208) is stripped with hydrogen-rich gas (220) in stripper (214) to form a stripped hydrotreated liquid (215), which is mixed with hydrogen-rich gas (220) and fed to a first isomerisation reactor (203) comprising at least one catalytic zone, where the stripped hydrotreated liquid (215) is isomerised to obtain a first isomerised effluent (216), which is separated into a gaseous fraction (218) and a first isomerised liquid (219) in separator (217).

Figure 3:
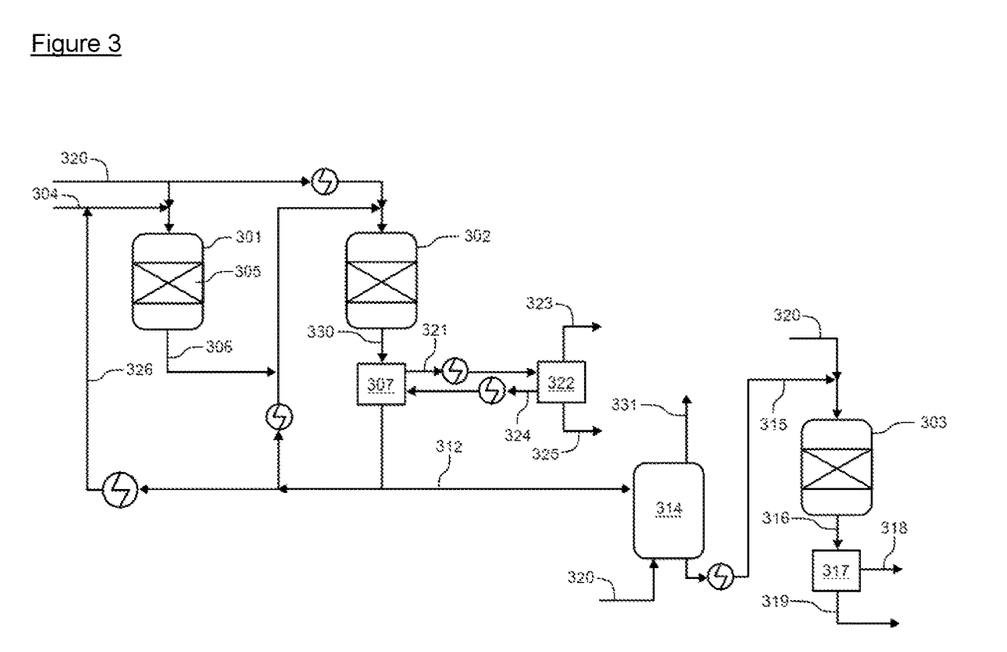
FIG. 3 shows a comparative process scheme not according to the present invention having a first hydrotreating reactor (301), a second hydrotreating reactor (302) and a first isomerisation reactor (303).

FIG. 3 is a comparative reactor setup referred to in comparative example 2 and in table 7. It is similar to FIG. 1, but does not include a separation step between the first and second hydrotreating reactor. FIG. 3 describes feeding oxygenated hydrocarbon feedstock (304) mixed with hydrogen-rich gas (320) and hydrocarbon diluting agent (326) in the form of product recycle to a first hydrotreatment reactor (301) comprising at least one catalytic zone (305). The first hydrotreated effluent (306) is mixed with hydrogen-rich gas (320) to form the feed for the second hydrotreating reactor (302) comprising at least one catalytic zone, where hydrodeoxygenation and hydrodenitrification is caused to obtain a second hydrotreating effluent (330), which is separated into a gaseous fraction (321) and a second hydrotreating liquid (312) in separator (307). Gaseous fraction (321) may be flashed again at a lower temperature into gaseous fraction (323), water rich fraction (325), and hydrocarbon rich fraction (324) in separator (322). The second hydrotreating liquid (312) is stripped with hydrogen-rich gas (320) in stripper (314) to form a stripped hydrotreated liquid (315), which is mixed with hydrogen-rich gas (320) and fed to a first isomerisation reactor (303) comprising at least one catalytic zone, where the stripped hydrotreated liquid (315) is isomerised to obtain a first isomerised effluent (316), which is separated into a gaseous fraction (318) and a first isomerised liquid (319) in separator (317).

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The terms "comprising", "comprise" and comprises herein are intended by the inventors to be optionally substitutable with the terms "consisting of", "consist of" and "consists of", respectively, in every instance.

EXAMPLES

Example 1

Low quality waste material originating from rendered animal fat waste containing beef tallow, pork lard and chicken fat, was used as feedstock for renewable fuel processing. The feedstock was purified using pretreatment by bleaching before directing it to a hydrotreatment process. Table 1 shows the carbon number distribution of the low-quality animal fat feedstock used before pretreatment measured by GC according to ISO 15304M.

TABLE 1

The carbon number distribution of the low-quality animal fat feedstock before pretreatment analyzed by GC.

| Fatty acid distribution | wt-% |
|---|---|
| C14:0 | 2.32 |
| C14:1 | 0.36 |
| C15:0 | 0.17 |
| C16:0 | 25.47 |
| C16:1 | 2.29 |
| C16:2 | 0.1 |
| C16:3 | 1.68 |
| C17:0 | 0.48 |
| C17:1 | 0 |
| C18:0 | 23.55 |
| C18:2 | 4.68 |
| C18:3 | 0.59 |
| C19:0 | 0.28 |
| C19:1 | 0.14 |
| C20:0 | 0.27 |
| C20:1 | 0.57 |
| C20:2 | 0.17 |
| C20:3 | 0 |
| C22:0 | 0.04 |
| unknown | 1.9 |
| TOTAL | 100 |

TABLE 2

Properties of the feedstock before pretreatment

| Method | Property | Animal fat waste |
|---|---|---|
| EN ISO 12185 | Density 15° C. | 913.4 kg/m$^3$ |
| EN ISO 12185 | Density 50° C. | 883.4 kg/m$^3$ |
| EN ISO 20846 | Sulphur | 71.5 ppm |
| ASTM D4629/D5762 | Nitrogen | 1120 ppm |
| ASTM D2710 | Bromine index | 24 g/100 g |
| ISO 3961 | Iodine number | 58 |
| ASTM D3242 | Free fatty acids (TAN) | 1.00 mg KOH/g |
| ENISO12937 | Water | 0.05% |

TABLE 3

Gel Permeation Chromatography (GPC) analysis on the feedstock components before pretreatment.

| Component | Amount (wt-%) |
|---|---|
| Oligomers | 0.4 |
| Triglycerides | 75.3 |
| Diglycerides | 15.4 |
| Monoglycerides | 0.4 |
| Carboxylic acids | 11.1 |

The feedstock was pretreated by bleaching before using it as feedstock for the hydrotreatment processing whereby the amount of nitrogen calculated as total elemental nitrogen was decreased to 1000 w-ppm, which was thus the nitrogen impurity level of the feed stream when entering it into hydrotreatment processing (see the entry "N content in the feed to HDO" in table 4).

The feedstock to be processed by hydrotreatment contained nitrogen impurities, inorganic and organic, the organic impurities being mainly in the form of organic nitrogen compounds, such as amides and amines, which were analyzed from the feed. The amount of metal impurities, such as Ca, Co, Fe, Mg, Mn, Ni and Zn, were less than 1 w-ppm which was the analysis detection accuracy limit for the specific ICP determination used. Equally, the amount of Al and Na impurities were less than 2 w-ppm, and P content was less than 1 w-ppm.

To illustrate the invention with various amounts of nitrogen, this pretreated feedstock was mixed with palm oil having a nitrogen content of 18 w-ppm to obtain six different concentrations of nitrogen (25, 75, 150, 300, 500, 1000 w-ppm) used in run 1-6 of this example.

The pretreated feedstocks containing various amounts of nitrogen (fresh feed) were introduced as six separate runs into a hydrodeoxygenation (HDO) fixed bed trickle bed reactor set-up according to FIG. 1. The HDO reaction was carried out in the presence of a catalyst bed containing 45000 kg sulphided NiMo on alumina support (fresh catalyst having a relative HDO activity compared to fresh HDO catalyst activity), under a pressure of 50 bar, a feed rate into the HDO reactor of 48000 kg/h, a total feed rate WHSV of 1.1 h$^{-1}$, at a H$_2$ flow of about 590 Nl H$_2$/l feed, and at a reaction temperature of about 309° C. measured at the HDO reactor inlet ($T_{IN}$), resulting in a temperature of about 340° C. at the HDO reactor outlet ($T_{OUT}$). Fresh hydrogen feed into the reactor was 33400 m$^3$/h (NTP) and the low-quality animal fat waste feed volume was 57 m$^3$/h. Liquid HDO product was recycled as diluting agent, and the ratio of product recycle to the fresh feed was about 6:1.

The effluent from the HDO reactor underwent separation into a liquid and a gaseous phase in a high temperature separator before being fed to the polishing reactor. The HDO reactor was connected to a polishing reactor as shown in FIG. 1. The polishing reactor is a fixed bed trickle bed reactor containing the same sulphided NiMo catalyst on alumina support as the HDO reactor (fresh catalyst having a relative HDO activity compared to fresh HDO catalyst activity), where the amount of the catalyst material was 15000 kg. The polishing reactor was operated under a pressure of 50 bar, having a feed rate WHSV of about 2.7 $h^{-1}$, and the polishing reactor inlet temperature ($T_{IN}$) was about 340° C., i.e. 31° C. higher than the HDO inlet temperature. The hydrogen amount used was about 8 vol-% of the amount of hydrogen used in the HDO reactor.

Table 4 shows the results of the test runs (run 1-6) with a set-up as shown in FIG. 1, as described above, where an HDO reactor is accompanied downstream by a polishing reactor, where the gaseous by-products including nitrogen containing compounds are removed in between the two reactors. As evident from table 4, the nitrogen content after the polishing step can be kept low despite very high nitrogen contents of the fresh feed. The low nitrogen amount is desirable in a product for various reasons, in particular because low nitrogen amounts influences the isomerisation reaction thereby causing better cold flow properties under identical isomerisation conditions compared to a product having a higher nitrogen amount prior to isomerisation (data not shown).

The nitrogen content may be decreased to ≤0.4 w-ppm by modifying the processing conditions, in particular increasing the processing temperature of the polishing reactor. The final nitrogen impurity was ≤0.3 w-ppm in all the runs (1-6). Increasing the temperature in the HDO reactor typically leads to uncontrollable reactions causing poor cold properties in the final isomerised product. After the hydrodeoxygenation and polishing the final liquid paraffinic effluent was hydroisomerized in an isomerization reactor. The isomerization was carried out in a fixed bed trickle bed reactor in the presence of a Pt-SAPO-catalyst under a pressure of 40 bar, with WHSV of 1.5 $h^{-1}$ and a reaction temperature of 328° C. Hydrogen to feed ratio was 300 normal litres $H_2$ per litre feed.

The very low nitrogen content of all the experiments led to products with excellent cold properties. After isomerization and separation by distillation an aviation fuel cut was obtained having a T10 (° C.) cut-off temperature from 185 to 205, a T90 (° C.) cut-off temperature from 270 to 295° C. and final boiling point (° C.) from 275 to 300° C., fulfilling the ASTM D7566 (2016), Annex A2 specification, having a density of less than 772 kg/m³ (measured according to ASTM 4052 (2018)) and a freezing point of less than −40° C. (measured according to IP529). The obtained aviation fuel component further has a turbidity point lower than −30° C. (determined according to ASTM D5771 (2017)) with an excellent yield of about 60 wt-%.

TABLE 4

HDO reactor and polishing reactor - fresh catalyst - FIG. 1

| | | Run 1 | Run 2 | Run 3 | Run 4 | Run 5 | Run 6 |
|---|---|---|---|---|---|---|---|
| Unreacted feed vs paraffin content at the entry into polishing reactor (110) | wt % | 0.4 | 0.5 | 0.5 | 0.6 | 0.7 | 0.8 |
| Unreacted feed vs paraffin content at the entry into the isomerization reactor (115) | wt % | <0.1 | <0.1 | <0.1 | <0.1 | <0.1 | 0.1 |
| N content in the feed to HDO (104) | w-ppm | 25 | 75 | 150 | 300 | 500 | 1000 |
| N content in the feed to HDO diluted 1:6 with HDO recycle | w-ppm | 5 | 14 | 28 | 56 | 92 | 183 |
| N content before entering polishing reactor (108) | w-ppm | 2.7 | 7.2 | 14 | 27 | 44 | 86 |
| N content before entering isomerization reactor (115) | w-ppm | <0.3 | <0.3 | <0.3 | <0.3 | <0.3 | <0.3 |
| Bromine Index (115) | mg/100 g | <20 | <20 | <20 | <20 | <20 | <20 |

Comparative Example 1

A reactor set-up according to FIG. 2 was tested as an alternative for efficiently removing the undesired oxygen and nitrogen impurities. In the set-up of FIG. 2, the same feed composition to example 1 was applied and essentially the same operating conditions (temperature, pressure, catalysts, etc.) were used as in example 1, with the exception that in this reactor set-up there was no polishing reactor (102) downstream of the HDO reactor. Rather in this example the entire catalyst amount of fresh catalyst (60000 kg) was in a single HDO reactor. The HDO reaction was carried out under a pressure of 50 bar, a feed rate into the HDO reactor of 48000 kg/h, a total feed rate WHSV of 0.8 $h^{-1}$, at a $H_2$ flow of about 590 Nl $H_2$/l feed, and at a reaction temperature of about 308° C. measured at the HDO reactor inlet ($T_{IN}$), resulting in a temperature of about 340° C. at the HDO reactor outlet ($T_{OUT}$). Fresh hydrogen feed into the reactor was 33400 m³/h (NTP) and the low-quality animal fat waste feed volume was 57 m³/h. Liquid HDO product was recycled as diluting agent, and the ratio of product recycle to the fresh feed was about 6:1.

Table 5 shows the results from the runs in a single HDO reactor as shown in FIG. 2, where the gaseous by-products including nitrogen containing compounds are removed after the HDO reactor before entering the liquid paraffinic effluent into the isomerisation stage.

As can be seen from table 5, the nitrogen content before the isomerisation reactor of all runs (7-12) were higher compared to the nitrogen content in example 1. The same amount of catalyst was used in comparative example 1 compared to example 1, but now inside a single reactor. This comparison shows that a single reactor is not able to remove the nitrogen in a similar efficient manner as in the case of splitting the catalyst volume into two separate reactors and removing the gaseous phase between these two reactors.

The increased nitrogen content in feed inevitably led to an increase of nitrogen in the final liquid paraffinic effluent stream to the isomerization thus resulting in poorer cold properties and yield for the aviation fuel component retrieved from the separation distillation after isomerization. A turbidity point of about −10° C. was obtained with aviation fuel yield of 5 wt-% in the run 12 where the nitrogen initial content was 1000 ppm.

TABLE 5

Single HDO reactor only - fresh catalyst - FIG. 2

|  |  | Run 7 | Run 8 | Run 9 | Run 10 | Run 11 | Run 12 |
|---|---|---|---|---|---|---|---|
| Unreacted feed vs paraffin content at the entry into the isomerization reactor | wt % | 0.1 | 0.1 | 0.1 | 0.1 | 0.2 | 0.3 |
| N content in the feed to HDO | ppm | 25 | 75 | 150 | 300 | 500 | 1000 |
| N content in the feed to HDO diluted 1:6 with HDO recycle | w-ppm | 5 | 14 | 28 | 55 | 90 | 180 |
| N content in liquid effluent (108) | ppm | 2.5 | 6.8 | 13 | 25 | 42 | 83 |
| N content before Isomerisation reactor | ppm | 0.6 | 0.9 | 1.1 | 1.5 | 2.0 | 2.9 |
| Bromine Index | mg/100 g | 87 | 113 | 134 | 159 | 183 | 219 |

Comparative Example 2

A reaction set-up as depicted by FIG. 3, otherwise similar to example 1 with the exceptions that two HDO reactors in series were used and that there was no gas removal after the first HDO reactor before entering the feed (306) into the second HDO reactor (302) downstream of the first HDO reactor (301). A catalyst bed similar to the polishing reactor catalyst bed of FIG. 1 was installed inside the second HDO reactor (302). The liquid paraffinic effluent (306) from the first HDO reactor was directed directly to the second HDO reactor i.e. without removal of the gaseous by-products including nitrogen containing compounds after the first HDO reactor before entering the liquid paraffinic effluent into the second HDO reactor. The final liquid paraffinic effluent stream (312) obtained after the second HDO reactor (302) was directed to the stripper (314) for removal of the gaseous impurities, and subsequently into the isomerization reactor. The catalysts and reaction conditions were the same as for example 1.

This reactor setup was similar to the prior art reactor setup described in US 2011/0094149 A1.

As can be seen from table 6, the nitrogen content of all the runs (13-18) caused much higher nitrogen contents compared to the nitrogen contents in example 1.

The set-up according to FIG. 3 was found to be able to reduce the lower amounts of nitrogen impurities, at lower amounts of nitrogen content in the initial feed, e.g. about 25 ppm of nitrogen or less. However, when the amount of nitrogen is increased to 150 wppm or higher in the fresh feed, the nitrogen remaining after the HDO and polishing reactors was increased to a value of 0.8 ppm, or higher. The increase of nitrogen content in the isomerization resulted in poorer cold properties and yield for the aviation fuel component retrieved from the separation distillation after isomerization, a turbidity point of about −15° C. was obtained with aviation fuel yield of 10 wt-% in the run 18 where the nitrogen initial content was 1000 ppm.

TABLE 6 two HDO reactors - fresh catalyst - FIG. 3

|  |  | Run 13 | Run 14 | Run 15 | Run 16 | Run 17 | Run 18 |
|---|---|---|---|---|---|---|---|
| Unreacted feed vs paraffin content at the entry into second HDO reactor | % | 0.3 | 0.4 | 0.5 | 0.6 | 0.7 | 0.8 |
| Unreacted feed vs paraffin content at the entry into the isomerization reactor | % | 0.1 | 0.1 | 0.1 | 0.1 | 0.1 | 0.2 |
| N content in the feed to HDO | w-ppm | 25 | 75 | 150 | 300 | 500 | 1000 |
| N content in the feed to HDO diluted 1:6 with HDO recycle | w-ppm | 5 | 14 | 27 | 53 | 88 | 198 |
| N content before entering polishing reactor | w-ppm | 4.4 | 13 | 25 | 50 | 83 | 166 |
| N content before entering isomerization reactor | w-ppm | 0.4 | 0.6 | 0.8 | 1.2 | 1.6 | 2.3 |
| Bromine Index | mg/100 g | 79 | 103 | 120 | 143 | 165 | 198 |

Example 2—Aged Catalyst

During operation, the activity of the catalyst in the HDO catalyst bed tends to decrease, eventually reaching the end of its life cycle and requiring a change of the catalyst material.

The following Run 20 shows the results obtained when using an HDO catalyst bed after a considerable time of operation (i.e. reaching the end-of-run point) at a point of time when the activity of the catalyst bed had decreased down to two-thirds of its initial value for the fresh catalyst bed. Comparative examples 1 and 2 (runs 19 and 21) have also been repeated with aged catalysts having lower activities. The reaction conditions of run 19, 20 and 21 are as described in comparative example 1, example 1 and comparative example 2, respectively—with the exception that the HDO temperature was increased as explained below.

The performance of the HDO reactor degrades as the activity of the catalyst decreases towards the end of its operation cycle. This gradual catalyst deactivation may be compensated to some extent by increasing the temperature of the HDO catalyst bed. In this example the temperature of the HDO reactors ($T_{IN}$) were increased about 11° C., from about 309 to about 320° C. at the point of end-of-run for the catalyst.

As it can be seen from the results in table 7, below, the reactor setup according to the invention still effectively removes the nitrogen content when using catalysts that are reaching the end-of-run point.

TABLE 7

Test runs made with different reactor set-ups according to FIGS. 1, 2 and 3 having aged catalyst beds (end-of run).

|  |  | Run 19 FIG. 2 | Run 20 FIG. 1 | Run 21 FIG. 3 |
|---|---|---|---|---|
| Relative HDO catalyst activity compared to fresh catalyst | % | 75 | 68 | 75 |
| Relative polishing/second HDO reactor catalyst activity compared to fresh catalyst | % | — | 98 | 75 |
| Unreacted feed vs paraffin content at the entry into polishing/second HDO reactor | % | — | 1.3 | 0.8 |
| Unreacted feed vs paraffin content at the entry into isomerization reactor | % | 0.2 | 0.1 | 0.2 |
| N content in the feed to first HDO | ppm | 1000 | 1000 | 1000 |
| N content before entering isomerization reactor | ppm | 3.0 | <0.3 | 2.6 |
| Bromine Index | mg/100 g | 225 | <20 | 207 |

Example 3—Aged Catalyst Beyond End-of-Run

The reactor set-ups as depicted in example 1 (FIG. 1) and in comparative examples 1 (FIG. 2) and 2 (FIG. 3) were used for an extended period of time compared to example 2 (end-of-run experiment). The operating cycle was extended to a point wherein the activity of the HDO reactor catalyst was lowered down to 60% of its activity compared to a fresh HDO catalyst.

This gradual catalyst bed degradation was no longer compensated by increasing the temperature of the HDO catalyst beds as was done in the end-of-run experiments (table 7), due to the risk of undesirable products. The temperatures were maintained at the same values as in the end-of-run measurements in example 2.

The results on the nitrogen removal efficiency of the extended run cycles in table 8 show that the reactor set-up having the HDO catalyst connected to a polishing bed reactor with removal of gaseous by-products (FIG. 1), including nitrogen containing compounds, was still able to maintain the very low level of nitrogen impurities, ≤0.3 ppm. In the comparative reactor set-ups (FIGS. 2 and 3), the nitrogen residue level started to increase, to 4.5 ppm and 4.2 ppm for the reactor set-up having single HDO catalyst bed and the reactor set-up having two HDO catalyst beds in sequence, respectively.

The results shown in table 7 therefore shows that the reactor setup according to the invention allows a continued operation beyond a catalyst deactivation, which would normally be characterised as being at the end-of-run.

TABLE 8

Test runs made with different reactor set-ups for an extended period of time beyond the typical end-of run time.

|  |  | Run 22 FIG. 2 | Run 23 FIG. 1 | Run 24 FIG. 3 |
|---|---|---|---|---|
| Relative HDO catalyst activity compared to fresh HDO catalyst activity | % | 70 | 60 | 70 |
| Relative polishing/second HDO reactor catalyst activity compared to fresh catalyst | % | — | 96 | 70 |
| Unreacted feed vs paraffin content at the entry into polishing/second HDO reactor | % | — | 2.0 | 1.1 |
| Unreacted feed vs paraffin content at the entry into the isomerization reactor | % | 0.3 | 0.1 | 0.3 |
| N content in the feed to first HDO | w-ppm | 1000 | 1000 | 1000 |
| N content before entering isomerization reactor | w-ppm | 4.5 | <0.3 | 4.2 |
| Bromine Index | mg/100 g | 311 | <20 | 260 |
| N content in the effluent (106, 206, 306) from the first HDO reactor | w-ppm | 182 | 187 | 178 |

The final nitrogen impurity content may be decreased even further by increasing the processing temperature of the polishing reactor. This does not, however, apply to the HDO reactor; if the processing temperature of the HDO reactor is increased this typically leads to uncontrollable reactions and poorer cold properties.

Table 4 shows the results of the test runs (experiments 1-6) with a set-up as depicted by FIG. 1, including an HDO reactor accompanied downstream by a polishing reactor, the both reactors having fresh catalyst beds, and wherein the gaseous by-products including nitrogen containing compounds are removed in between the two reactors.

Notably, despite of the increasing amount of nitrogen in the liquid paraffinic effluent stream after HDO entering the polishing reactor the final nitrogen amount determined in the infeed stream to the isomerization reactor still remained very low.

The invention claimed is:

1. Process for preparing hydrocarbons from an oxygenated hydrocarbon feedstock, comprising:
a first hydrotreatment reactor containing at least one catalytic zone, in which a hydrotreatment entry stream containing an oxygenated hydrocarbon feedstock and a hydrocarbon diluting agent is introduced into the catalytic zone together with a hydrogen-rich gas, at an inlet temperature and a pressure causing at least hydrodeoxygenation and hydrodenitrification to an extent where a first hydrotreated effluent from the first hydrotreatment reactor contains mainly hydrocarbons, and wherein the oxygenated hydrocarbon feedstock has been converted to ≥95% hydrocarbons;
the first hydrotreated effluent from the first hydrotreatment reactor is subjected to a separation stage where at least part of the first hydrotreated effluent is separated into a gaseous fraction and a first hydrotreated liquid, where the first hydrotreated liquid contains ≥95 wt % hydrocarbons, and >1 wppm nitrogen;
at least part of the first hydrotreated liquid excluding the gaseous fraction and a hydrogen-rich gas is introduced in a second hydrotreatment reactor containing at least one catalytic zone at an inlet temperature that is higher than the inlet temperature in the first hydrotreatment reactor and at a pressure causing hydrodeoxygenation and hydrodenitrification, where the first hydrotreated liquid is not mixed with a feed having an oxygen content that is higher than the oxygen content of the first hydrotreated liquid and where the first hydrotreated liquid is not mixed with a feed having a nitrogen content higher than the nitrogen content of the first hydrotreated liquid;

a second hydrotreated effluent from the second hydrotreatment reactor is subjected to one or more separation stages, where the second hydrotreated effluent is separated into a gaseous fraction and a second hydrotreated liquid and/or a stripped hydrotreated liquid, where the second hydrotreated liquid and/or the stripped hydrotreated liquid contains ≥99 wt % hydrocarbons and ≤1 wppm nitrogen, measured as elemental nitrogen.

2. Process according to claim 1, wherein the separation stage to which the second hydrotreated effluent is subjected comprises:

subjecting the second hydrotreated liquid or the second hydrotreated effluent to a stripping stage, where the second hydrotreated liquid or second hydrotreated effluent is stripped with a stripping gas causing the stripped hydrotreated liquid to have ≤0.4 wppm nitrogen, measured as elemental nitrogen;

isomerising the stripped hydrotreated liquid in a first isomerisation reactor containing at least one catalytic zone, in which the stripped hydrotreated liquid and a hydrogen-rich gas having ≤1 ppm (mol/mol) nitrogen, measured as elemental nitrogen, is introduced into the catalytic zone at a temperature and a pressure causing at least hydroisomerisation to produce a first isomerisation effluent; and the first isomerised effluent from the first isomerisation reactor is subjected to a separation stage, where the first isomerised effluent is separated into a gaseous fraction and a first isomerised liquid, where the first isomerised liquid contains ≥30 wt % branched hydrocarbons.

3. Process according to claim 1, further comprising:

isomerising the second hydrotreated liquid or the stripped hydrotreated liquid in a first isomerisation reactor containing at least one catalytic zone, in which the second hydrotreated liquid and a hydrogen-rich gas having ≤1 ppm (mol/mol) nitrogen, measured as elemental nitrogen, is introduced into the catalytic zone at an inlet temperature and a pressure causing at least hydroisomerisation to produce a first isomerisation effluent;

the first isomerised effluent from the first isomerisation reactor is subjected to a separation stage, where the first isomerised effluent is separated into a gaseous fraction and a first isomerised liquid, where the first isomerised liquid contains ≥30 wt % branched hydrocarbons, and/or an increase in branched hydrocarbons of ≥30 wt % compared to the second hydrotreated liquid.

4. Process according to claim 3, wherein the first isomerised liquid is separated into at least an aviation fuel having a cloud point of −40° C. or lower.

5. Process according to claim 1, wherein cooling is applied during the separation stage of the first hydrotreated effluent to an extent that the first hydrotreated liquid has a temperature below the inlet temperature of the first catalytic zone of the first hydrotreatment reactor.

6. Process according to claim 1, where a hydrocarbon diluting agent is not introduced to the second hydrotreatment reactor.

7. Process according to claim 1, where the extent of hydrodeoxygenation and hydrodenitrification in the first hydrotreatment reactor is controlled in such a manner that in the second hydrotreatment reactor the temperature increase between the reactor inlet and the reactor outlet is not more than 10° C.

8. Process according to claim 1, wherein the catalytic zone(s) in the first hydrotreatment reactor has a lower hydrodeoxygenation activity than the catalytic zone(s) in the second hydrotreatment reactor.

9. Process according to claim 1, wherein the hydrogen-rich gas used in the second hydrotreatment reactor contains ≤5 wppm nitrogen impurities, measured as elemental nitrogen.

10. Process according to claim 1, wherein the inlet temperature and pressure of the first hydrotreatment reactor is 200-400° C. and 10-150 bar.

11. Process according to claim 1, wherein the first hydrotreatment reactor includes at least three catalytic zones.

12. Process according to claim 1, wherein the catalytic zones of the first hydrotreatment reactor comprises:

one or more catalyst(s) selected from hydrogenation metal on a support.

13. Process according to claim 1, wherein the first hydrotreatment reactor is operated at a WHSV in the range from 0.5-3 h$^{-1}$; and a $H_2$ flow of 350-900 Nl $H_2$/l feed.

14. Process according to claim 1, wherein the inlet temperature and pressure of the second hydrotreatment reactor is 250-450° C. and 10-150 bar.

15. Process according to claim 1, wherein the second hydrotreatment reactor has a single catalytic zone.

16. Process according to claim 1, wherein the catalytic zones of the second hydrotreatment reactor comprise:

one or more catalyst(s) selected from hydrogenation metal on a support.

17. Process according to claim 1, wherein the second hydrotreatment reactor is operated at a WHSV in a range from 0.5-3 h$^{-1}$; and a $H_2$ flow of 350-900 Nl $H_2$/l feed.

18. Process according to claim 3, wherein the inlet temperature and pressure of the first isomerisation reactor is 280-370° C. and 20-50 bar.

19. Process according to claim 3, wherein the catalytic zones of the first isomerisation reactor comprise:

one or more catalyst(s) containing a Group VIII metal on a support, where the support is selected from silica, alumina, clays, titanium oxide, boron oxide, zirconia, which is used alone or as a mixture.

20. Process according to claim 19, wherein the one or more catalyst(s) comprise:

a molecular sieve.

21. Process according to claim 3, wherein the isomerisation reactor is operated at a WHSV in a range from 0.5-1 h$^{-1}$; and a $H_2$ flow of 300-500 Nl $H_2$/l feed.

22. Process according to claim 3, wherein the first isomerised liquid has an iso- to n-paraffin ratio above 1.

23. Process according to claim 1, wherein the hydrotreatment entry stream has a nitrogen impurity of 100 to 500 wppm.

24. Process according to claim 1, wherein the first hydrotreated effluent from the first hydrotreatment reactor has a nitrogen impurity of 100 to 500 wppm or more.

25. Process according to claim 1, where the second hydrotreated liquid and/or the stripped hydrotreated liquid contains ≥99 wt % hydrocarbons and ≤0.3 wppm nitrogen, measured as elemental nitrogen.

26. Process according to claim 1, wherein the hydrocarbon diluting agent is product recycle.

27. Process according to claim 1, wherein the separation stage to which the first hydrotreated effluent is subjected includes one or more separators.

28. Process according to claim 1, wherein the separation stage to which the first hydrotreated effluent is subjected includes a hydrogen stripper.

29. Process according to claim 1, wherein the oxygenated hydrocarbon feedstock has a nitrogen impurity of 300 wppm or more, measured as elemental nitrogen.

* * * * *